United States Patent
Remis et al.

(10) Patent No.: US 10,146,280 B2
(45) Date of Patent: Dec. 4, 2018

(54) RECONFIGURATION OF COMPUTING DEVICE AND/OR NON-VOLATILE MEMORY DEVICES BASED ON THERMAL ANALYSIS

(71) Applicant: LENOVO Enterprise Solutions (Singapore) PTE. LTD., New Tech Park (SG)

(72) Inventors: Luke Remis, Raleigh, NC (US); Mark E. Andresen, Cary, NC (US); Wilson Velez, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 127 days.

(21) Appl. No.: 15/280,468

(22) Filed: Sep. 29, 2016

(65) Prior Publication Data
US 2018/0088639 A1    Mar. 29, 2018

(51) Int. Cl.
| G06F 9/44 | (2018.01) |
| G06F 1/20 | (2006.01) |
| G06F 9/445 | (2018.01) |
| G06F 9/4401 | (2018.01) |

(52) U.S. Cl.
CPC ............ G06F 1/206 (2013.01); G06F 9/4411 (2013.01); G06F 9/44505 (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 2003/0088799 A1* | 5/2003 | Bodas ..................... G06F 1/206 713/320 |
| 2007/0106860 A1* | 5/2007 | Foster, Sr. ............ G06F 1/3225 711/170 |
| 2010/0211663 A1* | 8/2010 | Barboy ............. G06F 17/30233 709/223 |
| 2012/0095719 A1* | 4/2012 | Araki ..................... G01K 13/00 702/130 |
| 2017/0200077 A1* | 7/2017 | Weston .................. G06N 3/063 |

* cited by examiner

*Primary Examiner* — Zahid Choudhury
(74) *Attorney, Agent, or Firm* — Kunzler, PC; Jason Friday (57) ABSTRACT

An apparatus for reconfiguring a computing device includes an inventory module, a thermal analysis module, and a reconfiguration module. The inventory module detects one or more locations for one or more non-volatile memory express ("NVMe") devices. The one or more NVMe devices are coupled to a plurality of slots such that at least one of the slots is empty. The one or more NVMe devices thermally affect one or more further components of a computing device. The thermal analysis module determines one or more thermal characteristics for a current configuration and for one or more possible reconfigurations. The current configuration includes locations of the one or more NVMe devices and the one or more further components. The reconfiguration module selects a reconfiguration from the one or more possible reconfigurations based on the one or more determined thermal characteristics.

20 Claims, 7 Drawing Sheets

RECONFIGURATION OF COMPUTING DEVICE AND/OR NON-VOLATILE MEMORY DEVICES BASED ON THERMAL ANALYSIS

FIELD

The subject matter disclosed herein relates to computing devices including non-volatile memory and/or storage, and more particularly relates to reconfiguration of a computing device and/or non-volatile memory devices based on a thermal analysis.

BACKGROUND

As storage density and speeds increase for non-volatile storage and memory, power usage and dissipation by non-volatile memory devices may similarly increase. For example, non-volatile memory express ("NVMe") devices may use up to 25 watts. Similarly, four NVMe drives bundled side to side may dissipate as much heat as a 100 watt heater. Cooling airflow passing over other computer components, such as a central processing unit ("CPU"), memory, expansion cards, further internal peripheral devices, and the like, may be significantly preheated by waste heat from non-volatile drives. Attempting to cool components with preheated air may result in performance throttling to prevent overheating, or in increased fan speeds, with corresponding increases in noise and power usage.

BRIEF SUMMARY

An apparatus for reconfiguring a computing device is disclosed. A method and computer program product also perform the functions of the apparatus. The apparatus includes an inventory module that detects one or more locations for one or more non-volatile memory express ("NVMe") devices. The one or more NVMe devices are coupled to a plurality of slots such that at least one of the slots is empty. The one or more NVMe devices thermally affect one or more further components of a computing device. The apparatus includes a thermal analysis module that determines one or more thermal characteristics for a current configuration and for one or more possible reconfigurations. The current configuration includes locations of the one or more NVMe devices and the one or more further components. The apparatus includes a reconfiguration module that selects a reconfiguration from the one or more possible reconfigurations based on the one or more determined thermal characteristics.

In one embodiment, the one or more NVMe devices are upstream, with regard to cooling airflow, from the one or more further components. In a certain embodiment, the inventory module detects one or more locations for the one or more further components of the computing device. In some embodiments, the inventory module determines whether cables are crossed based on detecting which of one or more ports are coupled to the one or more NVMe devices. In certain embodiments, the current configuration further includes a mapping between the one or more ports and the one or more NVMe devices. In further embodiments, the one or more possible reconfigurations include one or more possible alternate mappings.

In one embodiment, the inventory module detects the one or more locations for the one or more NVMe devices using a management interface operating independently from a central processing unit ("CPU") based interface for the one or more NVMe devices. In a further embodiment, the inventory module detects the one or more locations for the one or more NVMe devices when an operating system for the computing device is not running. In a certain embodiment, the inventory module detects the one or more locations for the one or more NVMe devices in response to a power on event for the computing device and/or a change in configuration for the one or more NVMe devices.

In one embodiment, the thermal analysis module determines the one or more thermal characteristics based on: current settings for the computing device, information from one or more sensors for the computing device, part information for the one or more NVMe devices, part information for the one or more further components of the computing device, and/or application characterization for the computing device. In a certain embodiment, the thermal analysis module iteratively generates the one or more possible reconfigurations by iteratively identifying one or more possible changes to the current configuration, based on the one or more determined thermal characteristics.

In some embodiments, the apparatus includes a trigger module that activates the thermal analysis module to determine the one or more thermal characteristics in response to a trigger. In further embodiments, the trigger may include CPU throttling that exceeds a throttling threshold, a temperature that exceeds a temperature threshold, and/or a new configuration detected by the inventory module.

In one embodiment, the selected reconfiguration includes a new location for at least one NVMe device, based on concentrating heat from the one or more NVMe devices in a particular region, or on distributing heat from the one or more NVMe devices across a larger region than in the current configuration. In a certain embodiment, the reconfiguration module selects the selected reconfiguration based on a measurement prioritized by a user. In a further embodiment, the prioritized measurement may include a CPU temperature, a memory temperature, an expansion card temperature, a fan speed, and/or an acoustic measurement.

In one embodiment, the apparatus includes an alert module that communicates the selected reconfiguration to a user. In a certain embodiment, communicating the selected reconfiguration may include activating a light corresponding to an empty NVMe slot, to indicate a new location for at least one NVMe device, when an operating system for the computing device is not running. In some embodiments, the apparatus may include the computing device.

A method for reconfiguring a computing device includes detecting one or more locations for one or more NVMe devices. The one or more NVMe devices are coupled to a plurality of slots such that at least one of the slots is empty. The one or more NVMe devices thermally affect one or more further components of a computing device. The method includes determining one or more thermal characteristics for a current configuration and for one or more possible reconfigurations. The current configuration includes locations of the one or more NVMe devices and the one or more further components. The method includes selecting a reconfiguration from the one or more possible reconfigurations based on the one or more determined thermal characteristics.

In one embodiment, the method includes detecting one or more locations for the one or more further components of the computing device. In a certain embodiment, determining the one or more thermal characteristics is in response to a trigger. In a further embodiment, the trigger includes CPU throttling that exceeds a throttling threshold, a temperature that exceeds a temperature threshold, and/or a new configuration for the computing device. In some embodiments, the method includes communicating the selected reconfiguration to the user.

A program product for reconfiguring a computing device includes a computer readable storage medium that stores code executable by a processor. The executable code includes code to perform detecting one or more locations for one or more NVMe devices. The one or more NVMe devices are coupled to a plurality of slots such that at least one of the slots is empty. The one or more NVMe devices thermally affect one or more further components of a computing device. The executable code includes code to perform determining one or more thermal characteristics for a current configuration and for one or more possible reconfigurations. The current configuration includes locations of the one or more NVMe devices and the one or more further components. The executable code includes code to perform selecting a reconfiguration from the one or more possible reconfigurations based on the one or more determined thermal characteristics.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
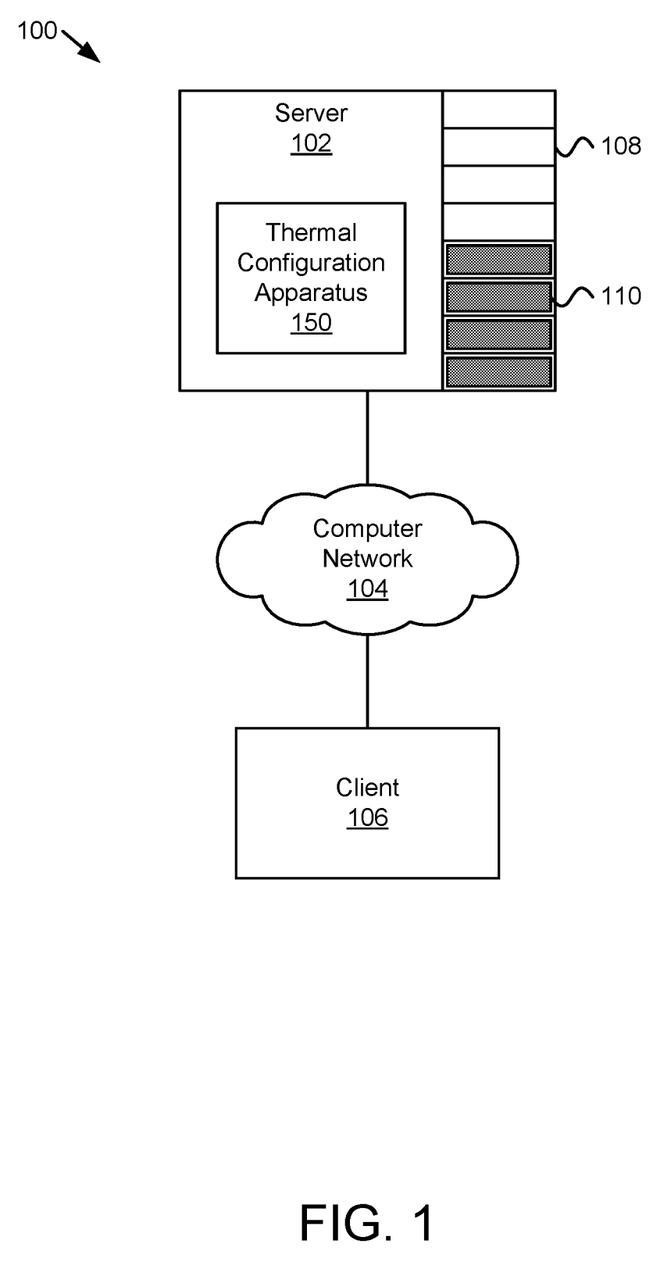
FIG. 1 is a schematic block diagram illustrating one embodiment of a system for reconfiguring a computing device.

FIG. 1 depicts one embodiment of a system 100 for reconfiguring a computing device. In the depicted embodiment, the system 100 includes a thermal configuration apparatus 150 operating on a server 102, a computer network 104, and a client 106.

In general, in various embodiments, a thermal configuration apparatus 150 may detect locations for non-volatile memory express ("NVMe") devices or other non-volatile drives that thermally affect further components of a computing device such as the server 102, determine thermal characteristics for a current configuration and for possible reconfigurations, and select a reconfiguration based on the determined thermal configuration. In further embodiments, the thermal configuration apparatus 150 may communicate the selected reconfiguration to a user or administrator for the computing device, and the user or administrator may reconfigure the computing device (e.g., by moving NVMe devices 110 to different slots 108, relocating other components, or the like). Reconfiguring a computing device based on determined thermal characteristics, in certain embodiments, may avoid excessive preheating of sensitive components, reduce or avoid CPU throttling, distribute heat so that fan speeds ramp up evenly for acoustic purposes, or the like. The thermal configuration apparatus 150 is described in further detail below with regard to the apparatuses 300, 400 of FIGS. 3 and 4

In one embodiment, the server 102 may be a mainframe, a blade server, a workstation, a desktop computer, or the like. In the depicted embodiment, the server 102 includes a plurality of slots 108 for NVMe devices 110, and one or more NVMe devices 110 coupled to the slots 108, such that at least one of the slots 108 is empty. In certain embodiments, the presence of empty slots 108 may allow NVMe devices 110 to be moved to other slots 108 to improve thermal characteristics of the server 102. In another embodiment, the server 102 may be reconfigured by moving components other than the NVMe devices 110, however. The server 102 may use the thermal configuration apparatus 150 to select a thermally favorable reconfiguration for the server 102.

An NVMe device 110, in various embodiments, may refer to any non-volatile storage device, non-volatile memory ("NVM") device, non-volatile drive, or the like, that conforms to the NVM Express standard, as it currently exists or as it may be developed in the future. In certain embodiments, high power usage of NVMe devices 110 may preheat cooling air before it reaches other components of a server 102, and a thermal configuration apparatus 150 may select, determine or identify a reconfiguration that improves thermal characteristics, reduces problems associated with preheating or the like. Although the thermal configuration apparatus 150 is disclosed herein for use with NVMe devices 110, the present disclosure may be similarly applicable to servers 102 or other computing devices using other types of non-volatile memory devices, other or future non-volatile memory protocols, or the like.

A slot 108, in various embodiments, may refer to a socket for an edge connector (e.g., a slot 108 for an M.2 NVMe module), or to any other type of socket, bay, connector, or the like, that is configured to receive or connect to an NVMe device 110. In various embodiments, a slot 108 may be located on a motherboard, a backplane separate from a motherboard, an expansion card, or the like. Many types of slots 108 for NVMe devices 110 will be clear in view of this disclosure.

The server 102 may use the authentication apparatus 150 to select a thermally favorable reconfiguration for the server 102 itself, the client 106, other computers via the computer network 104, or the like. In the depicted embodiment, the server 102 includes the NVMe devices 110 and slots 108, but in another embodiment, the thermal configuration apparatus 150 may be used to reconfigure any computing device including one or more NVMe devices 110 with at least one empty slot 108.

The client 106 may be a desktop computer, laptop computer, virtual machine, tablet, mobile phone, or the like. The client 106 may be in communication with the server 102 via the computer network 104. In one embodiment, the thermal configuration apparatus 150 may communicate with one or more users or administrators of the server 102, via the client 106. For example, in various embodiments, the thermal configuration apparatus 150 may communicate a selected reconfiguration to a user via a web page accessed by a client 106, an email program running on a client 106, a test message application running on a client 106, or the like. In another embodiment, the thermal configuration apparatus 150 may communicate directly with a user or administrator of the server 102 (e.g., using a display for the server 102), instead of communicating via a client 106.

In the depicted embodiment, the thermal configuration apparatus 150 operates on or is embodied by the server 102. In another embodiment, the thermal configuration apparatus 150 may operate on or be embodied by the client 106, a combination of the server 102 and the client 106, a computer that implements the thermal configuration apparatus 150 outside a server/client architecture, or the like. In view of this disclosure, many ways to implement a thermal configuration apparatus 150 are clear.

The computer network 104, in various embodiments, may include a local area network ("LAN"), a wireless connection, an Internet connection, or the like. The computer network 104 may include one or more switches, routers, data cables, transmitters, and the like normally associated with a computer network 104. In one embodiment, the computer network 104 includes multiple networks functioning to transmit data between the server 102 and the client 106, between a data storage device and the server 102, or the like.

A wireless connection for the computer network 104 may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2A:
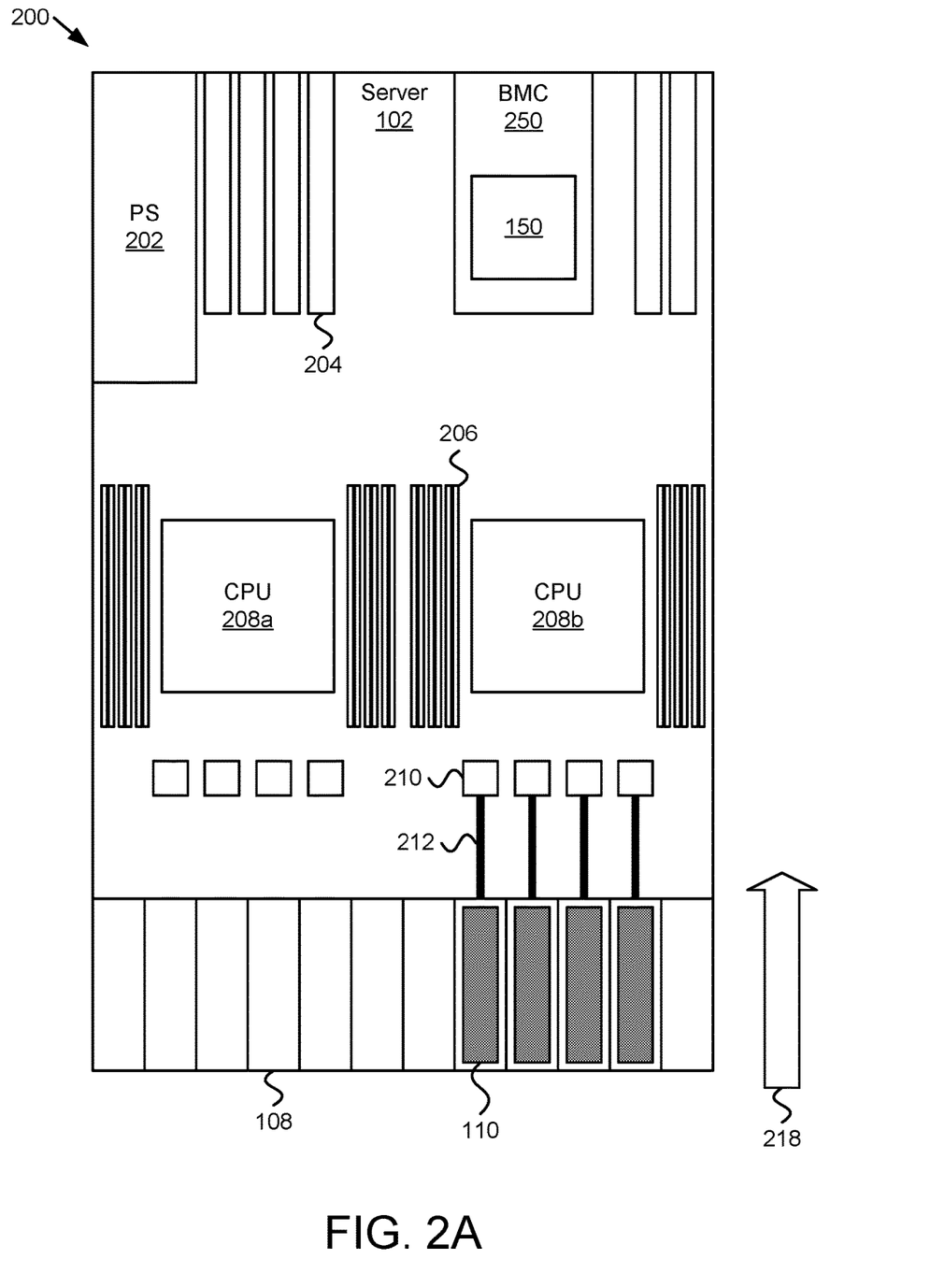
FIG. 2A is a schematic block diagram illustrating another embodiment of a system for reconfiguring a computing device.

FIG. 2A is a schematic block diagram illustrating another embodiment of a system 200 for reconfiguring a computing device. The system 200 includes a server 102, including slots 108 and NVMe devices 110. The server 102, slots 108, and NVMe devices 110 are substantially similar to those described above in relation to the system 100 of FIG. 1. Additionally, in the depicted embodiment, the server 102 includes further components such as a power supply 202, one or more expansion cards 204 (e.g., Peripheral Component Interconnect Express ("PCIe") boards, or the like), one or more memory modules 206 (e.g., dual in-line memory modules, or the like), one or more central processing units ("CPUs") 208, a baseboard management controller ("BMC") 250, and the like. The depicted components 202, 204, 206, 208, 250 are for illustrative and not limiting purposes; in another embodiment, a server 102 may include alternative and/or additional components. Various types of computer components for a server 102 or other computing device will be clear to one skilled in the art.

In the depicted embodiment, cables 212 couple ports 210 to NVMe devices 110. For example, in one embodiment, slots 108 for NVMe devices 110 may be located on one or more backplanes, and each cable 212 may couple a port 210 on a motherboard to a connector on a backplane, for a slot 108. In another embodiment, cables 212 may couple motherboard ports 210 directly to NVMe devices 110, without the use of a backplane. Various ways of coupling one or more NVMe devices 110 to a server 102 or other computing device, with or without cables 212, will be clear to one skilled in the art.

In embodiments that include cables 212, certain configurations of cables 212 may be more favorable for cooling than others. For example, crossed cables 212 may block cooling airflow in certain regions of the server 102, and rearranging the cables 212 (and, possibly, corresponding NVMe devices 110) may improve the thermal characteristics of the server 102.

In the depicted embodiment, the thermal configuration apparatus 150 operates on or is at least partially embodied by the BMC 250. In various embodiments, the BMC 250 may be a side-band and/or out-of-band management controller, which operates using power from the power supply 202, independently from the CPU(s) 208 or an operating system running on the CPU(s) 208. In certain embodiments, a BMC 250 may monitor and/or manage components of the server 102, regardless of whether an operating system has been booted. In further embodiments, a BMC 250 may include its own network connections for communicating with a user or administrator, connections to a management bus for monitoring and/or configuring components of the server 102, or the like.

In one embodiment, the thermal configuration apparatus 150 may use the BMC 250 to detect locations for NVMe devices 110, and/or detect locations for other components of the server 102. In a certain embodiment, the thermal configuration apparatus 150 may use the BMC 250 to determine thermal characteristics for a current configuration and for possible reconfigurations, and select a reconfiguration based on the determined thermal configuration. In a further embodiment, the thermal configuration apparatus 150 may use the BMC 250 communicate the selected reconfiguration to a user or administrator for the server 102. Various ways of configuring a thermal configuration apparatus 150 to use a BMC 250 or other side-band and/or out-of-band management controller will be clear in view of this disclosure.

In the depicted embodiment airflow 218 for cooling is in the direction indicated by the arrow. In various embodiments, airflow 218 for cooling may be directed in various directions by cooling fans, or the like. For example, in one embodiment, the server 102 may be a rack mounted server 102, with FIG. 2A depicting a top view of the server 102, and airflow 218 directed from front to back, from a cold aisle to a hot aisle of a data center, by fans within the server 102, rack mounted fans, or the like. In another embodiment, the server 102 may be outside a rack or data center environment, but may similarly be cooled by airflow 218 in various directions.

In the depicted embodiment, the NVMe devices 110 are upstream, with regard to the cooling airflow 218 from other components such as CPU 208b, some of the memory modules 206, and the like. Thus, the airflow 218 may be preheated by the NVMe devices 110 before it reaches other components. In certain embodiments, cooling of other components may be more difficult where airflow 218 is preheated. For example, fan speeds may be increased for cooling certain components, leading to increased power usage for cooling, and increased noise. In another embodiment, certain components may exceed thermal limits if the cooling airflow 218 is preheated by NVMe devices 110. For example, a temperature for CPU 208b may exceed a predetermined limit, leading to CPU throttling to avoid overheating.

Figure 2B:
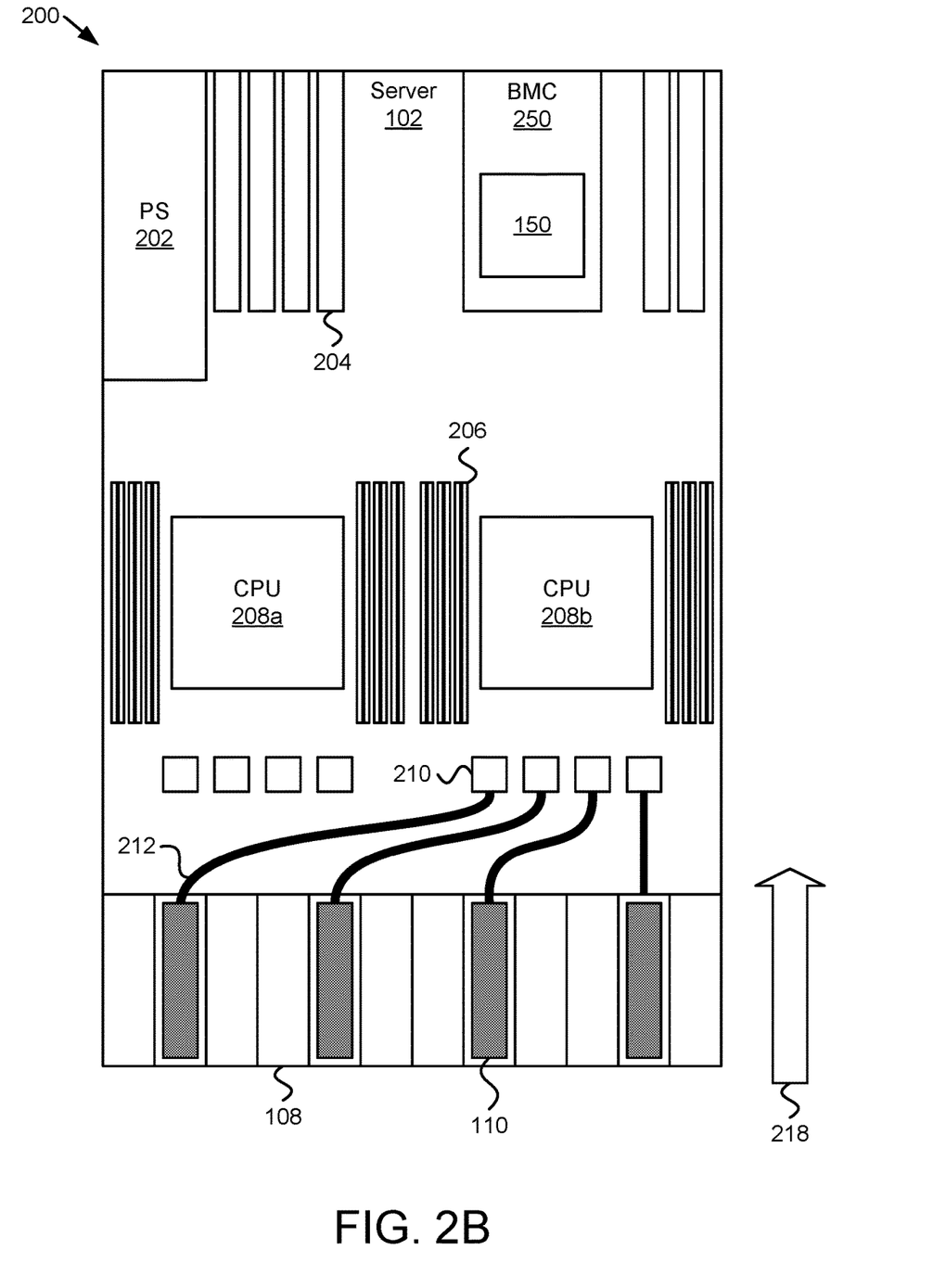
FIG. 2B is a schematic block diagram illustrating a reconfiguration of the system of FIG. 2A, in one embodiment.

FIG. 2B depicts a reconfiguration of the system 200 of FIG. 2A, in one embodiment. In certain embodiments, a configuration for a server 102 may refer to current locations for NVMe devices 110 and/or other components, and a reconfiguration may refer to alternate locations for the NVMe devices 110 and/or other components. In the depicted embodiment, the reconfiguration for the system 200 includes new locations for the NVMe devices 110: in FIG. 2A, the NVMe devices 110 are grouped together in front of one of the CPUs 208b, and in FIG. 2B, the NVMe devices 110 are more evenly distributed across the available slots 108. The reconfiguration of FIG. 2B may be selected by a thermal configuration apparatus 150 to distribute heat from the NVMe devices 110 across a larger region of the server 102 than in the original configuration of FIG. 2A. Distributing heat from the NVMe devices 110 across a larger region of the server 102 than in the original configuration may, in certain embodiments, avoid problems associated with concentrating heat in a particular region. For example, CPU 208b may be throttled in the configuration of FIG. 2A, to prevent overheating, but may operate at full speed in the reconfiguration of FIG. 2B, where heat from the NVMe devices 110 is more evenly distributed.

Figure 3:
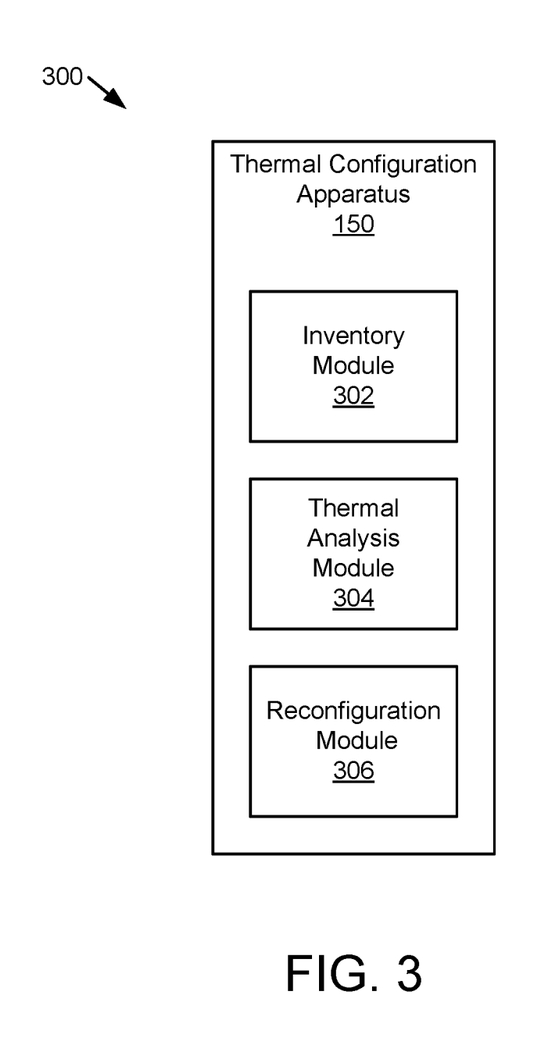
FIG. 3 is a schematic block diagram illustrating one embodiment of an apparatus for reconfiguring a computing device.

In another embodiment, the thermal configuration apparatus 150 may select a reconfiguration, unlike the reconfiguration of FIG. 2B, that concentrates heat from the one or more NVMe devices 110 in a particular region of the server 102. For example, if the server 102 includes an empty socket for a CPU 208, a reconfiguration may include new locations for the NVMe devices 110 in front of the empty socket, where the concentrated heat will not result in throttling a CPU 208. Various ways of reconfiguring a server 102 or other computing device are discussed in further detail below FIG. 3 depicts one embodiment of an apparatus 300 for reconfiguring a computing device. The apparatus 300 includes one embodiment of the thermal configuration apparatus 150, with an inventory module 302, a thermal analysis module 304, and a reconfiguration module 306, which are described below.

In the depicted embodiment, the thermal configuration apparatus 150 includes an inventory module 302 that detects one or more locations for one or more NVMe devices 110. In various embodiments, an inventory module 302 may include a side-band or out-of-band management controller such as a BMC 250, a management bus, a data storage device, a database storing information about components and/or component locations, a hardware circuit, a programmable hardware device, one or more processors, and/or a computer readable storage medium that stores code for execution by one or more processors. Other embodiments may include similar or equivalent devices for detecting locations for one or more NVMe devices 110.

As described above, an NVMe device 110, in various embodiments, may refer to any non-volatile storage device, non-volatile memory ("NVM") device, non-volatile drive, or the like, that conforms to the NVM Express standard, as it currently exists or as it may be developed in the future. Although the thermal configuration apparatus 150 is disclosed herein for use with NVMe devices 110, the present disclosure may be similarly applicable to servers 102 or other computing devices using other types of non-volatile memory devices, other or future non-volatile memory protocols, or the like.

In various embodiments, one or more NVMe devices 110 may be coupled to a plurality of slots 108 such that at least one of the slots 108 is empty. As described above, a slot 108, in various embodiments, may refer to a socket for an edge connector (e.g., a slot 108 for an M.2 NVMe module), or to any other type of socket, bay, connector, or the like, that is configured to receive or connect to an NVMe device 110, regardless of whether the slot 108 is located on a motherboard, a backplane separate from a motherboard, an expansion card 204, or the like. In further embodiments, an empty slot 108 may refer to a slot 108 that is not occupied by or connected to an NVMe device 110. In certain embodiments, the presence of empty slots 108 may allow NVMe devices 110 to be moved to other slots 108 to improve thermal characteristics of a computing device.

In certain embodiments, the one or more NVMe devices 110 may thermally affect one or more further components of a computing device. A computing device may be any computer, server 102, client 106, desktop computer, workstation, blade server, or the like, that includes the one or more NVMe devices 110 and further components. In a certain embodiment, the apparatus 300 may include the computing device. In one embodiment, the thermal configuration apparatus 150 may operate on the computing device that includes the one or more NVMe devices 110 and further components. In another embodiment, the thermal configuration apparatus 150 may operate on a separate computer, and may communicate with the computing device that includes the one or more NVMe devices 110 and further components via a computer 104.

In various embodiments, a component may refer any part, element, constituent or piece of a computing device. Certain components, such as a processor, memory modules 206, expansion cards 204, and the like, may be detachably connected to a motherboard for the computing device. Other components, such as a platform controller hub, or the like, may be non-removably connected (e.g., by surface-mount soldering) to a motherboard for the computing device. Various types of computing device components will be clear in view of this disclosure. Additionally, in certain embodiments, "further" components may refer to components other than the one or more NVMe devices 110.

In certain embodiments, one or more NVMe devices 110 may thermally affect one or more further components of a computing device in various ways. In general, a component (such as an NVMe device 110) may be said to thermally affect another component if the presence or operation of the first component has any effect on the temperature, thermal environment, cooling, or the like, for the second component. For example, in one embodiment, an NVMe device 110 may thermally affect another component by heat transfer: heat produced by the NVMe device 110 may be transferred to another component by conduction, convection, or radiation. Conversely, heat from the other component may, in some embodiments, be transferred to the NVMe device 110, if the NVMe device 110 is cooler.

In another embodiment, an NVMe device 110 may thermally affect a second component by affecting cooling airflow 218 that passes over the second component. NVMe devices 110, in a certain embodiment, may be upstream, with regard to cooling airflow 218 for one or more components. Cooling airflow 218 may refer to any flow of ambient or chilled air blown, directed, or otherwise passed over NVMe devices 110 or further components for absorbing waste heat, and "upstream" may indicate that the cooling airflow 218 passes over the "upstream" device before a "downstream" component. For example, cooling airflow 218 may be directed from the front to the back of a server rack, and NVMe devices 110 may be in front of a server 102, with further components behind the NVMe devices 110.

As an example of an NVMe device 110 affecting another component by affecting the cooling airflow 218, even if the NVMe device 110 and the second component are the same temperature, so that no heat transfer occurs between the NVMe device 110 and the second component, cooling airflow 218 may be preheated by heat from the NVMe device 110, so that the airflow 218 is less effective for cooling the second component. In another embodiment, an NVMe device 110 may thermally affect one or more further components by physically obstructing cooling airflow 218 for the further components. Various further ways that one or more NVMe devices 110 may thermally affect one or more further components of a computing device will be clear in view of this disclosure.

In certain embodiments, the inventory module 302 may detect one or more locations for the one or more NVMe devices 110. In one embodiment, detecting a location for an NVMe device 110 may include determining which slot 108 an NVMe device 110 is coupled to or located in. For example, the inventory module 302 may use a BMC 250 to identify what NVMe devices 110 are present, what slots 108 the NVMe devices 110 are located in, and the like, by monitoring management bus connections to backplanes, slots 108, or NVMe devices 110. In another embodiment, detecting a location for an NVMe device 110 may include determining what further components may be thermally affected by the NVMe device 110. For example, the inventory module 302 may monitor temperatures of various components during heavy usage of one or more NVMe devices 110, to identify further components that are thermally affected. Various ways of detecting NVMe device locations 110 will be clear in view of this disclosure.

In a further embodiment, the inventory module 302 may detect one or more locations for the one or more further components of the computing device that are thermally affected by the NVMe device(s) 110. For example, the inventory module 302 may use a BMC 250, management bus, thermal monitoring, or the like, to identify locations of one or more CPUs 208, memory modules 206, expansion cards 204, or the like. In another embodiment, the inventory module 302 may reference a database, data structure or the like to identify components and locations for a computing device. In certain embodiments, the inventory module 302 may take a hardware inventory, by identifying what NVMe devices 110 and further components are present for a computing device, and detecting, determining, or otherwise identifying locations for the NVMe devices 110 and further components.

In one embodiment, the inventory module 302 detects the one or more locations for the one or more NVMe devices 110 (and/or one or more further components of the computing device) using a management interface operating independently from a CPU based interface for the one or more NVMe devices 110. A management interface may refer to any interface for monitoring and/or managing capabilities of a computing device. In certain embodiments, a CPU based management interface may be capable of detecting NVMe devices 110 and other components while an operating system is running. However, it may be impractical to reconfigure a computing device (e.g., by moving one or more NVMe devices 110 or other components) while the operating system is running and the computing device is in use. For example, if the thermal reconfiguration apparatus 150 selects a reconfiguration that includes a new location for an NVMe device 110, relocating the NVMe device 110 might involve disconnecting the NVMe device 110 at a time when it is normally expected to be available for reading or writing data. Thus, in certain embodiments, a management interface may be provided that operates independently of the CPU 208. For example, in one embodiment, a BMC 250 may provide or be coupled to a management interface. The BMC 250 may be coupled to a power supply 202 and may be powered on and operating when power is available, regardless of whether the CPU 208 is running an operating system.

By using a management interface independent of a CPU 208, the inventory module 302, in certain embodiments, may detect one or more locations for the one or more NVMe devices 110 when an operating system for the computing device is not running. Detecting NVMe devices 110 when the operating system is not running may facilitate reconfiguring the computing device while the NVMe devices 110 are not in use.

In a certain embodiment, the inventory module 302 detects one or more locations for the one or more NVMe devices 110 (and/or further components) in response to a power on event for the computing device and/or a change in configuration for the one or more NVMe devices 110. A power on event may refer to any of various events involved in powering up and booting a computing device, such as receiving power from a power supply 202, receiving a restart signal from a user, or the like. In certain embodiments, NVMe devices 110 and other devices may be added, removed, or relocated while a computing device is powered down. Thus, detecting locations of NVMe devices 110 or other components in response to a power on even allows the inventory module 302 to take a periodic inventory that detects changes with possible thermal effects.

In various embodiments, a change in configuration for the one or more NVMe devices 110 may refer to NVMe devices 110 being added, removed, relocated, or the like. As described above, in certain embodiments, computing devices may be powered down during a change in configuration. However, in some embodiments, NVMe devices 110 may be hot swappable, and may be added, removed, or relocated while the computing device is operating. Thus, detecting NVMe device 110 locations in response to a change in configuration may allow the inventory module 302 to obtain updated locations without waiting for a power on event.

In one embodiment, the inventory module 302 may determine whether cables 212 are crossed based on detecting which of one or more ports 210 are coupled to the one or more NVMe devices 110. In some embodiments, slots 108 may be coupled to a processor by permanent connections. For example, slots 108 on a motherboard may be coupled to a processor by PCIe lanes on the motherboard. In another embodiment, however, slots 108 may be detachably connected to ports 210 for a CPU 208 via cables 212. For example, in one embodiment, where slots 108 are disposed on backplanes separate from a motherboard, cables 212 may connect non-empty slots 108 to ports 210 on the motherboard. However, locations of cables 212 may affect cooling for a computing device. For example, cables 212 may obstruct cooling airflow 218, particularly where cables 212 are crossed. Thus, in certain embodiments, the inventory module 302 may determine whether cables 212 are crossed.

As an example of determining whether cables 212 are crossed, in one embodiment, the inventory module 302 may include or have access to information regarding the topology of the computing device, indicating that a first, second, third, and fourth slot 108 are physically located adjacent to a first, second, third and fourth port 210, respectively. If the inventory module 302 detects that a cable 212 couples the first port 210 to an NVMe device 110 in the second slot 108, and that another cable 212 couples the second port 210 to an NVMe device 110 in the first slot 108, the inventory module 302 may determine that the cables 212 are crossed. In certain embodiments, the inventory module 302 may not have access to information about exactly how a cable 212 is routed, but the inventory module 302 may detect which ports 210 are coupled to which NVMe devices 110, and may access or create a mapping between ports 210 and NVMe devices 110 in the slots 108, to determine whether cables 212 are crossed.

In the depicted embodiment, the thermal configuration apparatus 150 includes a thermal analysis module 304 that determines one or more thermal characteristics for a current configuration and for one or more possible reconfigurations of the computing device. In various embodiments, a thermal analysis module 304 may include a side-band or out-of-band management controller such as a BMC 250, a management bus, temperature sensors, a data storage device, a database storing information about parts, settings and/or applications, a hardware circuit, a programmable hardware device, one or more processors, and/or a computer readable storage medium that stores code for execution by one or more processors. Other embodiments may include similar or equivalent devices for determining thermal characteristics.

In various embodiments, a configuration for a computing device may refer to any information regarding how the computing device is configured, such as what components are included, where the NVMe devices 110 are located, where further components are located, and/or the like. In a certain embodiment, a "configuration" may refer to a full inventory of NVMe devices 110, further components, and locations. In another embodiment, a "configuration" may omit certain parts and/or locations but may still be referred to as a configuration. Such an abbreviated configuration may still be useful for thermal analysis and reconfiguration purposes. A "current" configuration refers to information about the actual or present NVMe devices 110, components, and/or locations, while a "reconfiguration" or "possible reconfiguration" refers to a configuration that differs, in at least one aspect, from the current or present configuration.

In one embodiment, the current configuration includes locations of the one or more NVMe devices 110, as detected by the inventory module 302. In a further embodiment, the current configuration may include additional information such as locations of further components, a mapping between the one or more ports 210 and the one or more NVMe devices 110 (where the mapping corresponds, at least to some extent to cable 212 locations), or the like. Correspondingly, a possible reconfiguration may include one or more possible alternate locations for one or more NVMe devices 110 or further components, one or more possible alternate mappings between ports 210 and NVMe devices 110), and/or the like.

In various embodiments, the thermal analysis module 304 may determine one or more thermal characteristics for the current configuration and for one or more possible reconfigurations. A thermal characteristic, in various embodiments, may refer to any heat- or temperature-related characteristic, attribute, property, or the like, whether pertaining to the computing device as a whole, to a particular region or component within the computing device, to a particular subsystem, or the like. For example, a thermal characteristic may be an average temperature, a peak power usage, an average power usage, a CPU 208 temperature, a memory temperature, an NVMe device 110 temperature, a fan speed, a likelihood of temperature-based CPU throttling, or the like. Various types of thermal characteristics will be clear in view of this disclosure.

In certain embodiments, the thermal analysis module 304 may determine thermal characteristics by measuring actual thermal characteristics, by projecting likely thermal characteristics using a thermal model, or the like. For example, for a current configuration, the thermal analysis module 304 may access temperature sensors to determine thermal characteristics. As a further example, for a current configuration or a possible reconfiguration, the thermal analysis module 304 may determine thermal characteristics by creating or analyzing a thermal model based on part information, or the like.

In certain embodiments, the thermal analysis module 304 determines one or more thermal characteristics based on information such as current settings for the computing device, information from one or more sensors for the computing device, part information for the one or more NVMe devices 110, part information for the one or more further components of the computing device, and/or application characterization for the computing device. Current settings for the computing device may include any current parameters, such as a preset temperature above which CPU throttling occurs, a current fan speed setting, a "quiet" power setting that limits CPU usage to keep fan speeds low, installed applications for the computing device, or the like. For example, the thermal analysis module 304 may determine thermal characteristics based on a current maximum fan speed setting, or the like.

In certain embodiment, a computing device may include one or more sensors, such as temperature sensors, fan speed sensors, and the like, and the thermal analysis module 304 may determine thermal characteristics based on information from one or more sensors. For example, the thermal analysis module 304 may determine a thermal characteristic based on a current or historical temperature, a current or historical fan speed, or the like.

In one embodiment, the thermal analysis module 304 may use part information for the NVMe devices 110, or for one or more further components of the computing device, to determine a thermal characteristic. For example, the thermal analysis module 304 may receive or access product data that indicates a thermal design point, or an expected amount of dissipated heat, for an NVMe device 110 or another component, and may determine a thermal characteristic based on expected amount of dissipated heat.

In a certain embodiment, the thermal analysis module 304 may determine a thermal characteristic based on application characterization for the computing device. In various embodiments, application characterization may include any information about the characteristics of an application such as whether an application is CPU-intensive or memory-intensive, how frequently or heavily an application is used, or the like. For example, the thermal analysis module 304 may identify a commonly used, CPU-heavy application, and determine a thermal characteristic based on an expectation of heavy CPU use. In another embodiment, the thermal analysis module 304 may determine that a computing device heavily uses a media server application, and may determine a thermal characteristic based on an expectation of a light CPU load with heavy memory and storage usage. Various ways to determine a thermal characteristic based on current settings, sensor information, part information, and/or application characterization will be clear in view of this disclosure.

In a certain embodiment, the thermal analysis module 304 iteratively generates the one or more possible reconfigurations by iteratively identifying one or more possible changes to the current configuration, based on the one or more determined thermal characteristics. For example, in one embodiment, the thermal analysis module 304 may determine thermal characteristics for the current configuration, and for a possible reconfiguration that differs in one way from the current configuration, (e.g., by moving an NVMe device 110 to another slot 108). If the thermal characteristics for the possible reconfiguration are improved compared to the current configuration, the thermal analysis module 304 may iteratively generate a further possible reconfiguration (e.g., by moving an NVMe device 110 further, by moving an additional NVMe device 110).

On the contrary, if the thermal characteristics are not improved in the first iteration, the thermal analysis module 304 may iteratively generate a new possible reconfiguration that changes the current configuration in a different way. In certain embodiments, the thermal analysis module 304 may initially generate several random reconfigurations, and iteratively improve the possible reconfigurations based on the determined thermal configurations. Various ways of iteratively generating and analyzing possible reconfigurations to improve thermal characteristics will be clear in view of this disclosure.

In the depicted embodiment, the thermal configuration apparatus 150 includes a reconfiguration module 306 that selects a reconfiguration from the one or more possible reconfigurations based on the one or more thermal characteristics determined by the thermal analysis module 304. In various embodiments, a reconfiguration module 306 may include a side-band or out-of-band management controller such as a BMC 250, a management bus, a data storage device, a hardware circuit, a programmable hardware device, one or more processors, and/or a computer readable storage medium that stores code for execution by one or more processors. Other embodiments may include similar or equivalent devices for selecting a reconfiguration.

In various embodiments, selecting a reconfiguration may refer to identifying, selecting, or choosing a reconfiguration to communicate to a user or administrator, to be used to actually reconfigure the computing device. In various embodiments, the reconfiguration module 306 may select a reconfiguration from the possible reconfigurations for which the thermal analysis module 304 determined thermal characteristics in various ways. The reconfiguration module 306 selects a reconfiguration based on the one or more determined thermal characteristics. In certain embodiments, the reconfiguration module 306 may give more or less weight to certain determined thermal configurations. For example, in one embodiment the reconfiguration module 306 may select a reconfiguration that improves a more important or heavily weighted thermal characteristic, even if the selected reconfiguration worsens a less important or less heavily weighted thermal characteristic.

In one embodiment, the selected reconfiguration includes a new location for at least one NVMe device 110. Because NVMe devices 110 may disperse up to 25 watts of power in a small space, relocating an NVMe device 110 may significantly improve one or more thermal characteristics for a computing device. In one embodiment, the reconfiguration module 306 may select a reconfiguration based on concentrating heat from the NVMe devices 110 in a particular region. A "region" may refer to a volume or area within a computing device. In some embodiments, concentrating heat in a particular region may improve performance in more important regions. For example, in a computing device with an empty CPU socket, the reconfiguration module 306 may select a reconfiguration that positions the NVMe devices 110 near or in front of the empty CPU socket, so that one or more other CPUs 208 can be cooled with non-preheated air.

In another embodiment, the reconfiguration module 306 may select a reconfiguration based on distributing heat from the one or more NVMe devices 110 across a larger region than in the current configuration. For example, in the current configuration, NVMe devices 110 may be tightly clustered, and heat may be concentrated in a certain area. In the selected reconfiguration, by contrast, the NVMe devices 110 may be relocated, so that the heat is more evenly distributed. Distributing heat across a larger region may avoid overheating, CPU throttling, and the like, that might occur where heat is concentrated in a smaller region.

In certain embodiments, the reconfiguration module 306 may select a reconfiguration that includes a new location for one or more further components of the computing device. For example, instead of moving NVMe devices 110 to be near an empty CPU socket, a CPU 208 may be moved to the empty socket. Many further ways to select a reconfiguration for a computing device will be clear in view of this disclosure.

Figure 4:
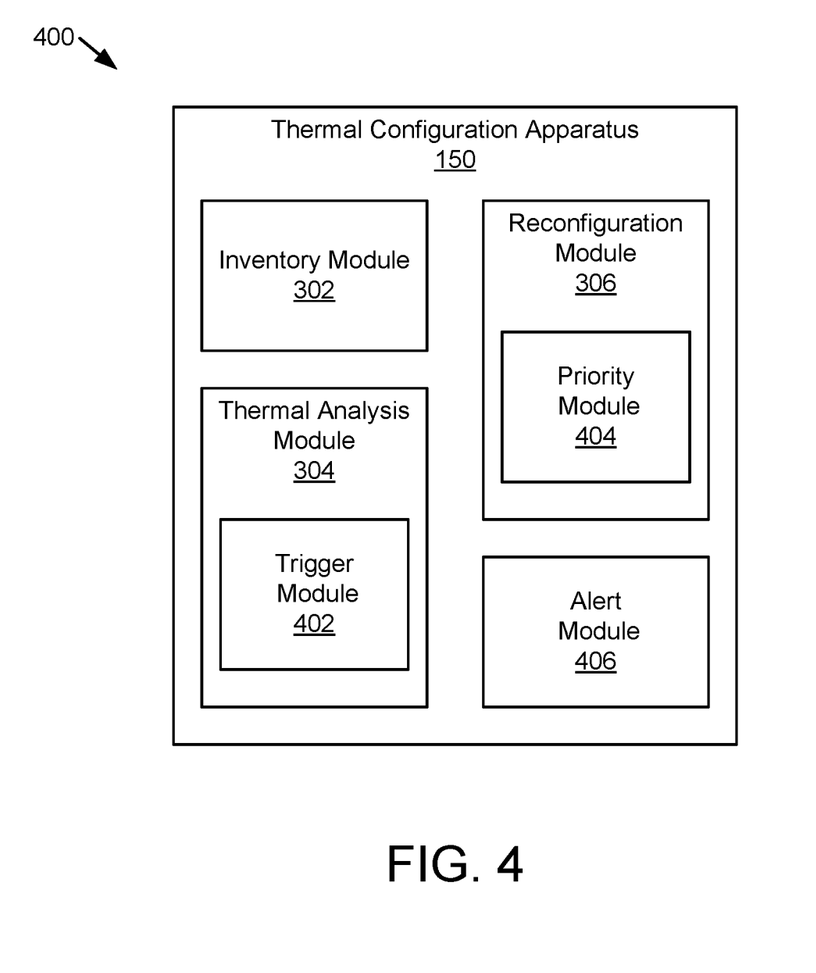
FIG. 4 is a schematic block diagram illustrating another embodiment of an apparatus for reconfiguring a computing device.

FIG. 4 depicts another embodiment of an apparatus 400 for reconfiguring a computing device. The apparatus 400 includes an embodiment of the thermal configuration apparatus 150 with an inventory module 302, a thermal analysis module 304, and a reconfiguration module 306, which are substantially similar to those described above in relation to the apparatus 300 of FIG. 3. The thermal analysis module 304, in various embodiments, may include a trigger module 402, which is described below. The reconfiguration module 306, in various embodiments, may include a priority module 404, which is described below. Additionally, in certain embodiments, the thermal configuration apparatus 150 includes an alert module 406, which is described below.

In the depicted embodiment, the thermal analysis module 304 includes a trigger module 402 that activates the thermal analysis module 304 to determine the one or more thermal characteristics in response to a trigger. In various embodiments, a trigger module 402 may include a side-band or out-of-band management controller such as a BMC 250, a management bus, temperature sensors, a data storage device, a database storing information about a configuration for the computing device, a hardware circuit, a programmable hardware device, one or more processors, and/or a computer readable storage medium that stores code for execution by one or more processors. Other embodiments may include similar or equivalent devices for activating the thermal analysis module 304.

In certain embodiments, a trigger may refer to any event, condition, or set of events and/or conditions that suggest that the current configuration of the computing device is unsatisfactory, or could be improved by reconfiguration. The inventory module 302 may periodically determine locations for NVMe devices 110 (e.g., at startup, or in response to a configuration change), and the trigger module 402 may activate the thermal analysis module 304 to determine thermal characteristics for possible reconfigurations in response to a trigger, so that the trigger activates a thermal analysis, resulting in the reconfiguration module 306 selecting a reconfiguration.

In one embodiment, a trigger for the trigger module 402 to activate the thermal analysis module 304 may include CPU throttling that exceeds a throttling threshold. A throttling threshold may refer to a measure or characterization that distinguishes acceptable levels of CPU throttling from levels of CPU throttling that indicate a thermal problem, a need for thermal reconfiguration, or the like. For example, in one embodiment, a throttling threshold may be exceeded if any CPU throttling occurs. In another embodiment, a throttling threshold may be exceeded if CPU throttling occurs above a threshold rate or frequency. Various ways of defining a CPU throttling threshold and determining whether the throttling threshold is exceeded will be clear in view of this disclosure.

In another embodiment, a trigger for the trigger module 402 to activate the thermal analysis module 304 may include a temperature that exceeds a temperature threshold. A temperature threshold may refer to a measure or characterization that distinguishes acceptable temperature levels from temperature levels that indicate a thermal problem, a need for thermal reconfiguration, or the like. For example, in one embodiment, a temperature threshold may be exceeded if a CPU temperature, memory temperature, or the like exceeds a predefined maximum. In another embodiment, a temperature threshold may be exceeded if an average temperature for the computing device is higher than a design temperature. Various ways of defining a temperature threshold and determining whether the temperature threshold is exceeded will be clear in view of this disclosure.

In another embodiment, a trigger for the trigger module 402 to activate the thermal analysis module 304 may include a new configuration detected by the inventory module 302. For example, if the inventory module 302 detects that an NVMe device 110 or another component has been added, removed, or relocated, the trigger module 402 may activate the thermal analysis module 304 to determine thermal characteristics of possible reconfigurations, in case a reconfiguration may improve the new configuration. I certain embodiments, the trigger for the trigger module 402 may include any set or combination of individual triggers, including CPU throttling that exceeds a throttling threshold, a temperature that exceeds a temperature threshold, and/or a new configuration detected by the inventory module 302.

In the depicted embodiment, the reconfiguration module 306 uses a priority module 404 to select a reconfiguration based on a measurement prioritized by a user or administrator of the computing device. In various embodiments, a priority module 404 may include a side-band or out-of-band management controller such as a BMC 250, a management bus, temperature sensors, a data storage device, a user interface device for requesting and receiving prioritized measurements, a hardware circuit, a programmable hardware device, one or more processors, and/or a computer readable storage medium that stores code for execution by one or more processors. Other embodiments may include similar or equivalent devices for selecting a reconfiguration based on a prioritized measurement.

In various embodiments, the reconfiguration module 306 may select a reconfiguration based on a predetermined measurement or objective for the thermal characteristics of the computing device. For example, the reconfiguration module 306 may select a reconfiguration to reduce an average temperature, to reduce a temperature for a particular component (e.g., a CPU temperature), to reduce a peak temperature, or the like. However, in certain embodiment, a predefined basis for selecting a reconfiguration may not reflect a user's own priorities. Thus, the priority module 404, in general, allows a user to prioritize a measurement as a basis for the reconfiguration module 306 to select a reconfiguration.

A prioritized measurement may refer to any quantity or measurement that a user has provided as a basis for selecting a reconfiguration. For example, in various embodiments, a prioritized measurement may include a CPU temperature, a memory card temperature, an expansion card 204 temperature, a fan speed, an acoustic measurement, or the like. In one embodiment, a user may prioritize a temperature for a particular component based on how heavily the component is used, how sensitive the component is to high temperatures, how difficult the component is to replace, or the like, and the reconfiguration module 306 may use the prioritized measurement from the priority module 404 to select a reconfiguration that improves the temperature for that component. In another embodiment, a user may prioritize a fan speed or acoustic measurement (such as a sound pressure level), and the reconfiguration module 306 may use the prioritized measurement from the priority module 404 to select a reconfiguration that improves the fan speed or other acoustic measurement, even if the reconfiguration worsens another thermal characteristic.

In a certain embodiment, the priority module 404 may communicate with a user to identify a prioritized measurement by presenting an interface for prioritizing a measurement, using a web interface, a dialog box interface, a configuration file, or the like. Various ways of obtaining and using a prioritized measurement as a basis for selecting a reconfiguration will be clear in view of this disclosure.

In the depicted embodiment, the thermal configuration apparatus 150 includes an alert module 406 that communicates the selected reconfiguration to a user. In various embodiments, an alert module 406 may include a side-band or out-of-band management controller such as a BMC 250, a monitor, a front panel display for a rack-mounted server, an email, text, or web interface, a data storage device, a database storing the selected reconfiguration, a programmable hardware device, one or more processors, and/or a computer readable storage medium that stores code for execution by one or more processors. Other embodiments may include similar or equivalent devices for communicates the selected reconfiguration to a user.

In various embodiments, the alert module 406 may communicate the selected reconfiguration from the reconfiguration module 306 to a user. In further embodiments, the user may reconfigure the computing device according to the selected reconfiguration. Thus, the alert module 406 may communicate the selected reconfiguration by providing a description of the selected reconfiguration, instructions for reconfiguring the computing device, or the like.

In various embodiments, the alert module 406 may communicate the selected reconfiguration to the user in various ways, using various types of interfaces. For example, in certain embodiments, the alert module 406 may display a web page, send an email, send a text message, or the like, to the user, with information about the selected reconfiguration. In another embodiment, the alert module 406 may use a front panel display for a rack-mounted server to display information about the selected reconfiguration. Various ways of communicating information about the selected reconfiguration will be clear in view of this disclosure.

In a certain embodiment, the alert module 406 may communicate the selected reconfiguration by activating a light (e.g. a light-emitting diode) corresponding to an empty NVMe slot 108, to indicate a new location for at least one NVMe device 110. For example, in one embodiment, a backplane with multiple NVMe slots 108 may include a light for each slot 108, and the alert module 406 may activate a light to indicate that an NVMe device 110 should be moved to the corresponding slot 108. In a further embodiment, the alert module 406 may activate multiple lights in sequence, to indicate where a first NVMe device 110 should be located, where a second NVMe device 110 should be located, and so on. In certain embodiments, the alert module 406 may be capable of operating such lights when the computing device is connected to a power source, regardless of whether the computing device is booted up or an operating system is running. For example, an alert module 406 operating on a BMC 250 may operate even if a CPU 208 is not running. Thus, by activating slot 108 lights to communicate locations for NVMe devices 110, the alert module 406 may communicate the selected reconfiguration when an operating system for the computing device is not running. Communicating the selected reconfiguration without using a running operating system may allow the user to reconfigure a system without hot-swapping NVMe devices 110 or otherwise interfering with the running operating system.

Figure 5:
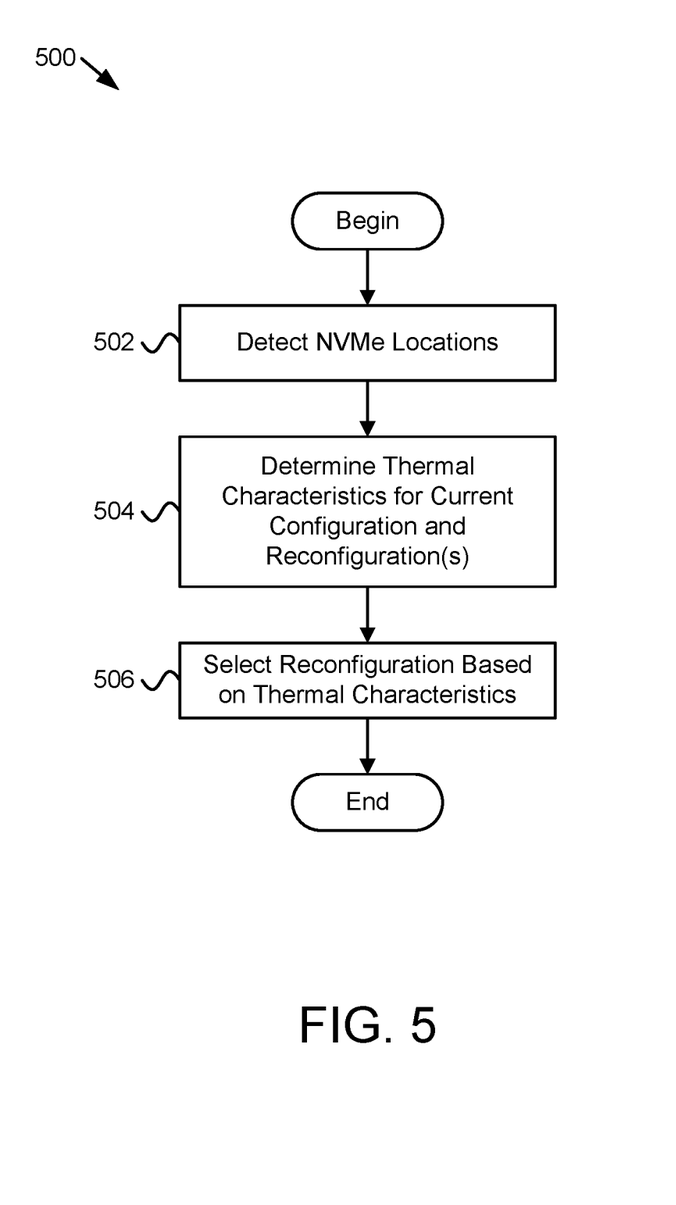
FIG. 5 is a schematic flow chart diagram illustrating one embodiment of a method for reconfiguring a computing device.

FIG. 5 is a schematic flow chart diagram illustrating one embodiment of a method 500 for reconfiguring a computing device. The method 500 begins, and detects 502 locations of one or more NVMe devices 110. In one embodiment, the inventory module 302 detects 502 the locations for the NVMe devices 110. The method 500 determines 504 one or more thermal characteristics for a current configuration comprising locations of the one or more NVMe devices 110 and the one or more further components, and for one or more possible reconfigurations of the computing device. In one embodiment, the thermal analysis module 304 determines 504 the one or more thermal characteristics. The method 500 selects 506 a selects a reconfiguration from the one or more possible reconfigurations based on the one or more determined thermal characteristics, and the method 500 ends. In one embodiment, the reconfiguration module 306 selects 506 the reconfiguration.

Figure 6:
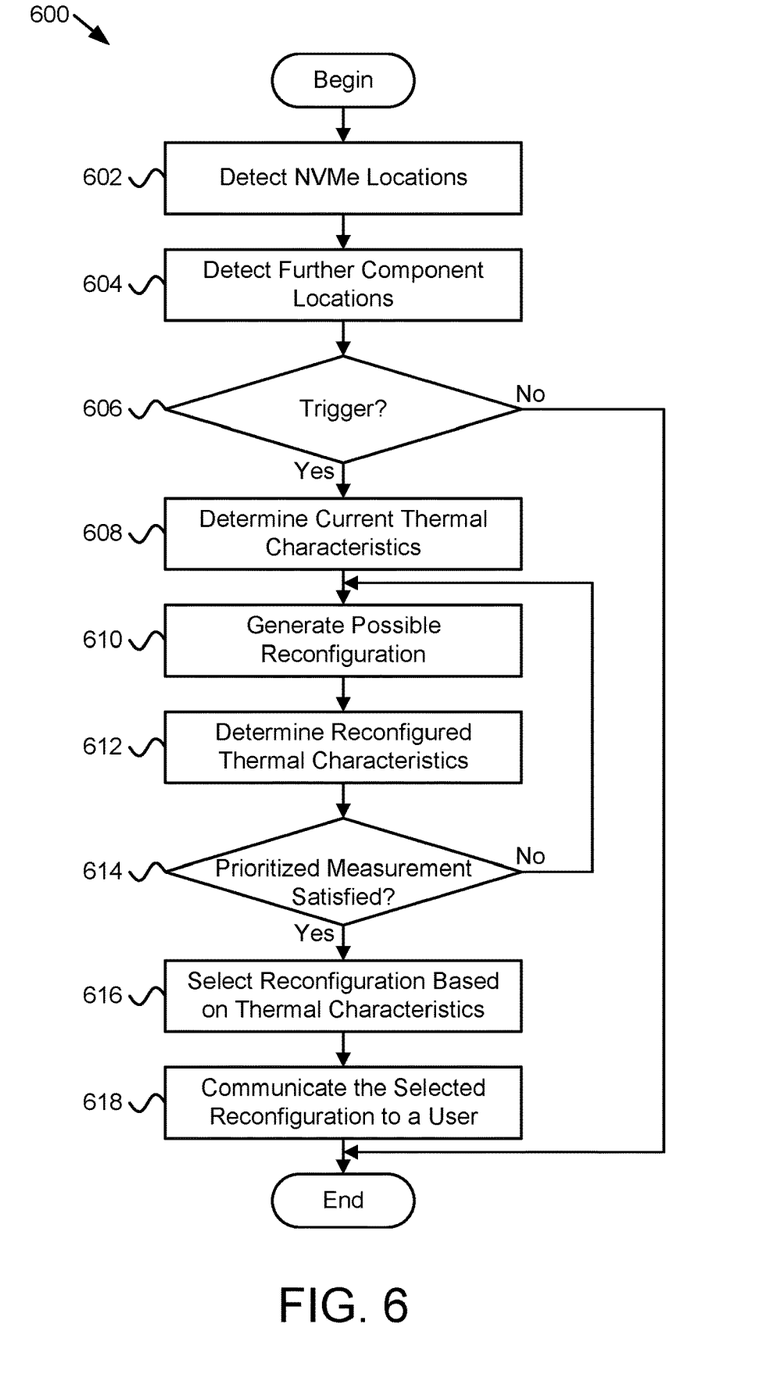
FIG. 6 is a schematic flow chart diagram illustrating another embodiment of a method for reconfiguring a computing device.

FIG. 6 is a schematic flow chart diagram illustrating one embodiment of another method 600 for reconfiguring a computing device. The method 600 begins, and detects 602 locations of one or more NVMe devices 110. In one embodiment, the inventory module 302 detects 602 the locations for the NVMe devices 110. The method 600 detects 604 one or more locations for one or more further components of the computing device. In one embodiment, the inventory module 302 detects 604 the locations for further components. The method 600 determines 606 whether a trigger has occurred. In one embodiment, the trigger module 402 determines 606 whether the trigger has occurred. If the trigger has not occurred, the method 600 ends.

If the trigger has occurred, the method 600 determines 608 one or more thermal characteristics for a current configuration of the computing device. In one embodiment, the thermal analysis module 304 determines 608 the current thermal characteristics. The method 600 generates 610 a possible reconfiguration, and determines 612 one or more thermal characteristics for the reconfiguration. In one embodiment, the thermal analysis module 304 generates 610 the possible reconfiguration, and determines 612 the thermal characteristics for the reconfiguration. The method 600 determines 614 whether a prioritized measurement is satisfied by the determined thermal characteristics for the reconfiguration. In one embodiment, the reconfiguration module 306 may determine 614 whether the prioritized measurement is satisfied. If the prioritized measurement is not satisfied, the method 600 continues, and generates 610 another possible reconfiguration.

If the prioritized measurement is satisfied, the method 600 selects 616 the reconfiguration based on the determined thermal characteristics. In one embodiment, the reconfiguration module 306 selects 616 the reconfiguration. The method 600 communicates 618 the selected reconfiguration to a user, and the method 600 ends. In one embodiment, the alert module 406 communicates 618 the selected reconfiguration to a user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an inventory module that detects one or more locations for one or more non-volatile memory express ("NVMe") devices coupled to a plurality of slots such that at least one of the slots is empty, wherein the one or more NVMe devices thermally affect one or more further components of a computing device;
    a thermal analysis module that determines one or more thermal characteristics for a current configuration comprising locations of the one or more NVMe devices and the one or more further components, and for one or more possible reconfigurations; and
    a reconfiguration module that selects a reconfiguration from the one or more possible reconfigurations based on the one or more determined thermal characteristics,
    wherein said modules comprise one or more of hardware circuits, a programmable hardware device, and a processor executing code.

2. The apparatus of claim 1, wherein the one or more NVMe devices are upstream, with regard to cooling airflow, from the one or more further components.

3. The apparatus of claim 1, wherein the inventory module detects one or more locations for the one or more further components of the computing device.

4. The apparatus of claim 1, wherein the inventory module determines whether cables are crossed based on detecting which of one or more ports are coupled to the one or more NVMe devices, the current configuration further comprising a mapping between the one or more ports and the one or more NVMe devices, and the one or more possible reconfigurations comprising one or more possible alternate mappings.

5. The apparatus of claim 1, wherein the inventory module detects the one or more locations for the one or more NVMe devices using a management interface operating independently from a central processing unit ("CPU") based interface for the one or more NVMe devices.

6. The apparatus of claim 5, wherein the inventory module detects the one or more locations for the one or more NVMe devices when an operating system for the computing device is not running.

7. The apparatus of claim 1, wherein the inventory module detects the one or more locations for the one or more NVMe devices in response to one or more of a power on event for the computing device and a change in configuration for the one or more NVMe devices.

8. The apparatus of claim 1, wherein the thermal analysis module determines the one or more thermal characteristics based on one or more of:
    current settings for the computing device,
    information from one or more sensors for the computing device,
    part information for the one or more NVMe devices,
    part information for the one or more further components of the computing device, and
    application characterization for the computing device.

9. The apparatus of claim 1, wherein the thermal analysis module iteratively generates the one or more possible reconfigurations by iteratively identifying one or more possible changes to the current configuration, based on the one or more determined thermal characteristics.

10. The apparatus of claim 1, further comprising a trigger module that activates the thermal analysis module to determine the one or more thermal characteristics in response to a trigger, the trigger comprising one or more of central processing unit ("CPU") throttling that exceeds a throttling threshold, a temperature that exceeds a temperature threshold, and a new configuration detected by the inventory module.

11. The apparatus of claim 1, wherein the selected reconfiguration comprises a new location for at least one NVMe device, based on one of: concentrating heat from the one or more NVMe devices in a particular region and distributing heat from the one or more NVMe devices across a larger region than in the current configuration.

12. The apparatus of claim 1, wherein the reconfiguration module selects the selected reconfiguration based on a measurement prioritized by a user, the prioritized measurement comprising one of a central processing unit ("CPU") temperature, a memory temperature, an expansion card temperature, a fan speed, and an acoustic measurement.

13. The apparatus of claim 1, further comprising an alert module that communicates the selected reconfiguration to a user.

14. The apparatus of claim 13, wherein communicating the selected reconfiguration comprises activating a light corresponding to an empty NVMe slot, to indicate a new location for at least one NVMe device, when an operating system for the computing device is not running.

15. The apparatus of claim 1, further comprising the computing device.

16. A method comprising:
    detecting one or more locations for one or more non-volatile memory express ("NVMe") devices coupled to a plurality of slots such that at least one of the slots is empty, wherein the one or more NVMe devices thermally affect one or more further components of a computing device;
    determining one or more thermal characteristics for a current configuration comprising locations of the one or more NVMe devices and the one or more further components, and for one or more possible reconfigurations; and
    selecting a reconfiguration from the one or more possible reconfigurations based on the one or more determined thermal characteristics.

17. The method of claim 16, further comprising detecting one or more locations for the one or more further components of the computing device.

18. The method of claim 16, wherein determining the one or more thermal characteristics is in response to a trigger, the trigger comprising one or more of central processing unit ("CPU") throttling that exceeds a throttling threshold, a temperature that exceeds a temperature threshold, and a new configuration for the computing device.

19. The method of claim 16, further comprising communicating the selected reconfiguration to a user.

20. A program product comprising a non-transitory computer readable storage medium that stores code executable by a processor, the executable code comprising code to perform:
  detecting one or more locations for one or more non-volatile memory express ("NVMe") devices coupled to a plurality of slots such that at least one of the slots is empty, wherein the one or more NVMe devices thermally affect one or more further components of a computing device;
  determining one or more thermal characteristics for a current configuration comprising locations of the one or more NVMe devices and the one or more further components, and for one or more possible reconfigurations; and
  selecting a reconfiguration from the one or more possible reconfigurations based on the one or more determined thermal characteristics.

* * * * *